US011238206B1

United States Patent
Sivaswamy et al.

(10) Patent No.: US 11,238,206 B1
(45) Date of Patent: Feb. 1, 2022

(54) PARTITION WIRE ASSIGNMENT FOR ROUTING MULTI-PARTITION CIRCUIT DESIGNS

(71) Applicant: Xilinx, Inc., San Jose, CA (US)

(72) Inventors: Satish B. Sivaswamy, Fremont, CA (US); Nitin Deshmukh, Monroe, WA (US); Garik Mkrtchyan, Fremont, CA (US); Grigor S. Gasparyan, San Jose, CA (US)

(73) Assignee: Xilinx, Inc.

( * ) Notice: Subject to any disclaimer, the term of this patent is extended or adjusted under 35 U.S.C. 154(b) by 0 days.

(21) Appl. No.: 17/213,474

(22) Filed: Mar. 26, 2021

(51) Int. Cl.
*G06F 30/392* (2020.01)
*G06F 30/3312* (2020.01)
*G06F 30/327* (2020.01)
*G06F 30/373* (2020.01)
*G06F 30/3953* (2020.01)
*G06F 30/3947* (2020.01)
*G06F 30/398* (2020.01)

(52) U.S. Cl.
CPC .......... *G06F 30/392* (2020.01); *G06F 30/327* (2020.01); *G06F 30/3312* (2020.01); *G06F 30/373* (2020.01); *G06F 30/398* (2020.01); *G06F 30/3947* (2020.01); *G06F 30/3953* (2020.01)

(58) Field of Classification Search
CPC .. G06F 30/392; G06F 30/3312; G06F 30/327; G06F 30/373; G06F 30/3953; G06F 30/3947; G06F 30/398
USPC ....... 716/131, 130, 129, 125, 124, 123, 122, 716/113, 105; 703/16
See application file for complete search history.

(56) References Cited

U.S. PATENT DOCUMENTS

| | | | |
|---|---|---|---|
| 4,924,589 A | 5/1990 | Leedy et al. | |
| 5,880,598 A | 3/1999 | Duong | |
| 6,145,117 A * | 11/2000 | Eng | G06F 30/39 716/105 |
| 6,230,304 B1 * | 5/2001 | Groeneveld | G06F 30/327 716/113 |
| 6,727,726 B1 * | 4/2004 | Plants | H03K 19/17728 326/38 |
| 7,030,466 B1 | 4/2006 | Hsuan et al. | |
| 7,111,268 B1 | 9/2006 | Anderson et al. | |
| 7,127,696 B2 | 10/2006 | Alpert et al. | |

(Continued)

OTHER PUBLICATIONS

Deng et al., "3-Dimensional VLSI: A 2.5 Dimensional Integration Scheme", Tsinghua University Press, Beijing and Springer-Verlag, Berlin Heidelberg, 2010, 211 pages. (Year: 2010).*

(Continued)

*Primary Examiner* — Phallaka Kik
(74) *Attorney, Agent, or Firm* — Kevin T. Cuenot

(57) ABSTRACT

Performing partition wire assignment for routing a multi-partition circuit design can include performing, using computer hardware, a global assignment phase by clustering a plurality of super-long lines (SLLs) into a plurality of SLL bins, clustering loads of nets of a circuit design into a plurality of load clusters, and assigning the plurality of SLL bins to the plurality of load clusters. For each SLL bin, a detailed assignment phase can be performed wherein each net having a load cluster assigned to the SLL bin is assigned one or more particular SLLs of the SLL bin using the computer hardware.

20 Claims, 9 Drawing Sheets

(56) References Cited

U.S. PATENT DOCUMENTS

| | | | |
|---|---|---|---|
| 7,146,590 B1 | 12/2006 | Chaudhary | |
| 7,152,217 B1 | 12/2006 | Srinivasan | |
| 7,163,842 B2 | 1/2007 | Karnezos | |
| 7,979,831 B1 | 7/2011 | Srinivasan | |
| 8,122,420 B1 | 2/2012 | Kannan et al. | |
| 8,156,456 B1 | 4/2012 | Rahman et al. | |
| 8,201,130 B1 | 6/2012 | Kalman et al. | |
| 8,205,182 B1 * | 6/2012 | Zlatanovici | G06F 30/327 716/125 |
| 8,283,771 B2 | 10/2012 | Somasekhar et al. | |
| 8,418,115 B1 | 4/2013 | Tom et al. | |
| 8,458,640 B2 | 6/2013 | Gao et al. | |
| 8,671,379 B1 | 3/2014 | Jain et al. | |
| 8,886,481 B1 | 11/2014 | Rahman et al. | |
| 8,966,425 B1 * | 2/2015 | Eisenstadt | G06F 30/394 716/120 |
| 9,996,652 B2 | 6/2018 | Sinnadurai et al. | |
| 10,496,777 B1 | 12/2019 | Venkatakrishnan et al. | |
| 2002/0176238 A1 | 11/2002 | Crane et al. | |
| 2004/0098694 A1 | 5/2004 | Teig et al. | |
| 2005/0127490 A1 | 6/2005 | Black et al. | |
| 2009/0106723 A1 | 4/2009 | Malekkhosravi | |
| 2010/0031217 A1 | 2/2010 | Sinha | |
| 2010/0271071 A1 | 10/2010 | Bartley et al. | |
| 2011/0055791 A1 | 3/2011 | Gao | |
| 2015/0154337 A1 | 6/2015 | Fang | |
| 2018/0341738 A1 | 11/2018 | Kahng et al. | |
| 2021/0084103 A1 * | 3/2021 | Smith | G06F 9/485 |

OTHER PUBLICATIONS

Altera Corporation, "Hyper-Pipelining for Stratix 10 Designs," Jun. 8, 2015, <https://www.altera.com/content/dam/altera-www/global/en_US_pdsf/liter-ature/an/an715.pdf>, 29 pg.

Synopsys, Inc., "Synopsys Synplify Premier, The Ultimate FPGA Implementation Platform,The best of both worlds: Productivity & Perfomrance," 2011, <http://www.synopsys.com/Tools/Implementation/FPGAImplementation/Docum-ents/synpremier-brochure.pdf>, 4 pg.

Xilinx, Inc., "UltraScale Architecture Configurable Logic Block User Guide," UG574, v1.4, Nov. 24, 2015, <http://www.xilinx.com/support/documentation/user_guides/ug574-ultrasc-ale-eb.pdf>, 60 pg.

Altera, "Netlist Optimization and Physical Synthesis," Quadus II Handbook, version 13.1, vol. 2, Nov. 2013, 16 pages. URL http://www.altera.com/literature/hb/qls/qls_qii52007.pdf.

Altera, "Timing Closure and Optimization," Quadus II Handbook, version 13.1, vol. 2, Nov. 2013, 46 pages. URL http://www.altera.com/literature/hb/qls/qls_qii52005.pdf.

Xilinx, Inc., "Xilinx Stacked Silicon Interconnect Technology Delivers Breakthrough FPGA Capacity, Bandwidth, and Dower Efficiency," White Paper v1 .2, Dec. 11, 2012, 10 pages, San Jose, CA USA, URL http://www.xilinx.com/upport/documentation/white papers/WP380 Stacked Silicon Interconnect Technology.pdf.

Karypis, George et al., "Multilevel Hypergraph Partitioning: Applications in VLSI Domain," IEEE Transactions on Very_ Large Scale Integration (VLSI) Sy_stems, Mar. 1999, pp. 69-79, vol. 7, No. 1, IEEE, Piscataway, New Jersey, USA.

Parivallal Kannan, et al., Performance driven Routing for Modem FPGAs Invited Paper, 6 pages., ICCAD '16, Nov. 7-10, 2016.

Larry McMurchie, et al., PathFinder: A Negotiation-Based Performance-Driven Router for FPGAs, Proceedings of the Third International ACM Symposium on Field-Programmable Gate Arrays (FPGA'95), 7 pages, Apr. 1995.

Yao-Wen Chang, et al., A New Global Routing Algorithm for FPGAs, 6 pages., ACM, 1994.

* cited by examiner

PARTITION WIRE ASSIGNMENT FOR ROUTING MULTI-PARTITION CIRCUIT DESIGNS

TECHNICAL FIELD

This disclosure relates to integrated circuits (ICs) and, more particularly, to routing circuit designs to generate a partition wire assignment for multi-partition circuit designs.

BACKGROUND

Some circuit designs may be partitioned into sub-designs for implementation in a particular device. One such example is a circuit design intended for implementation in a multi-die integrated circuit (IC). Multi-die ICs may be implemented using a variety of different technologies. One example technology, referred to as "stacked silicon interconnect technology or "SSIT," stacks one or more dies on an interposer. The interposer implements many wires that may be used to communicatively link nodes within the various dies stacked thereon. As an example, an interposer may provide thousands of wires that are available to make connections between nodes in different dies. To implement a circuit design within a multi-die IC, the circuit design is partitioned into a plurality of smaller sub-designs called "partitions." Each partition may be allocated to a die of the multi-die IC. This means that the circuit design will include one or more nets that cross die boundaries as such nets span from one partition to another.

Computer-Aided Design (CAD) tools are used to route the circuit design including the nets that span multiple dies. To route such nets, the CAD tools must assign the nets to available interposer wires. While available CAD tools are capable of generating partition routing solutions for circuit designs intended for implementation in a multi-die IC, such solutions are often of lower Quality of Result or "QOR" than is the case with circuit designs intended for implementation within an IC having a single, monolithic die. For circuit designs for multi-die ICs, in the typical case, available CAD tools require extensive runtimes to generate a partition routing assignment. In many cases, circuit designs that utilize a significant percentage of the available interposer wires are not routable by available CAD tools.

SUMMARY

A method can include performing, using computer hardware, a global assignment phase by clustering a plurality of super-long lines (SLLs) into a plurality of SLL bins, clustering loads of nets of a circuit design into a plurality of load clusters, and assigning the plurality of SLL bins to the plurality of load clusters. The method can include, for each SLL bin, performing a detailed assignment phase wherein each net having a load cluster assigned to the SLL bin is assigned one or more particular SLLs of the SLL bin using the computer hardware.

A system includes a processor configured to initiate operations. The operations can include performing a global assignment phase by clustering a plurality of SLLs into a plurality of SLL bins, clustering loads of nets of a circuit design into a plurality of load clusters, and assigning the plurality of SLL bins to the plurality of load clusters. The operations can include, for each SLL bin, performing a detailed assignment phase wherein each net having a load cluster assigned to the SLL bin is assigned one or more particular SLLs of the SLL bin.

In another aspect, a computer program product includes one or more computer readable storage media, and program instructions collectively stored on the one or more computer readable storage media. The program instructions are executable by computer hardware to initiate operations. The operations can include performing a global assignment phase by clustering a plurality of SLLs into a plurality of SLL bins, clustering loads of nets of a circuit design into a plurality of load clusters, and assigning the plurality of SLL bins to the plurality of load clusters. The operations can include, for each SLL bin, performing a detailed assignment phase wherein each net having a load cluster assigned to the SLL bin is assigned one or more particular SLLs of the SLL bin.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to integrated circuits (ICs) and, more particularly, to routing circuit designs to generate a partition wire assignment for a multi-partition circuit design. Circuit designs may be subdivided, or "partitioned," into a plurality of different sub-designs referred to as "partitions" for any number of reasons. In one example, the circuit design is intended to be implemented in a multi-die IC where each partition is allocated or assigned to a particular die of the multi-die IC. As an example, one or more of the dies of the multi-die IC may include programmable circuitry (e.g., programmable logic).

In another example, the circuit design may include one or more sub-designs that have corresponding physical constraints indicating where such sub-designs are to be located in an IC. The IC may be a multi-die IC or may be implemented using a single, monolithic die. In still another example, the circuit design includes different sub-designs or sub-regions with defined boundaries between them. The sub-regions of an Application-Specific IC, for example, may be designed by different design teams and later connected together into the final, larger, circuit design. In another example, pin planning for a circuit design may be modeled as a multi-partition problem to be solved.

In each of the foregoing examples, the different partitions are to be communicatively linked within the final implementation of the circuit design. Typically, the partitions are connected by a limited, or constrained, number of wires thereby posing a bottleneck problem. The different partitions effectively compete for the limited routing resources of the target IC.

In accordance with the inventive arrangements described within this disclosure, a Computer Aided Design (CAD) system is provided that is capable of generating a partition wire assignment that assigns wires to nets of a multi-partition design that span two or more partitions. The example implementations described herein are capable of assigning nets that cross partition boundaries to particular wires belonging to the set of limited routing resources available and reserved for connecting the partitions.

For purposes of illustration, this disclosure uses the example of a circuit design that is partitioned for implementation in a multi-die IC. It should be appreciated, however, that the inventive arrangements described within this disclosure may be used and/or applied to any of a variety of routing, pin assignment, or other bottleneck type of problems, including those described above, that may arise in implementing a circuit design including a plurality of partitions within a target IC.

Figure 1:
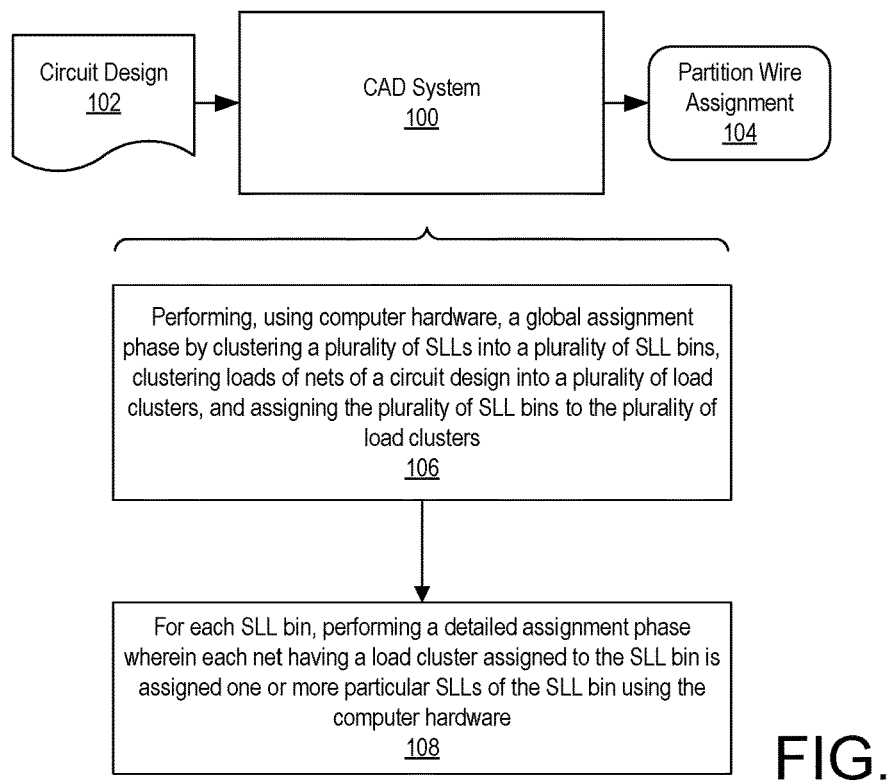
FIG. 1 illustrates an example of a Computer-Aided Design (CAD) system configured in accordance with the inventive arrangements.

FIG. 1 illustrates an example of a CAD system 100. An example implementation of a computer that may be used to implement CAD system 100 is described herein in connection with FIG. 16. CAD system 100 is capable of processing a circuit design 102 to generate a partition wire assignment 104 that assigns nets to super-long lines (SLLs) of a target integrated IC. Within this disclosure, the term "net," unless otherwise specified, refers to a net that spans or connects two or more partitions. Other nets may be implemented entirely within partitions to connect sources and loads that are located within a single partition. Such other nets may be routed using a separate process applied to each partition subsequent to generating, and based on, partition wire assignment 104. A "target IC" is the particular IC in which circuit design 102 is to be implemented. In the example, circuit design 102 may be specified as a data structure using hardware description language, RTL, as a netlist, or the like. Further, circuit design 102 may be partitioned to include a plurality of partitions.

As defined herein, the term "super logic region" or "SLR" means a region of circuitry in an IC, e.g., a target IC, to which a partition of a circuit design is allocated and ultimately implemented. As defined herein, the term "super-long line" or "SLL" means a wire that is reserved for, and used to, connect circuit nodes located in different partitions of a circuit design. One endpoint of an SLL connects to circuitry located in a first partition and the other endpoint of the SLL connects to circuitry located in a second partition. Since partitions are assigned to particular SLRs, an SLL further refers to a wire that connects different SLRs. An SLL typically has a minimum length that is longer than other wires used to connect nodes located within a same partition. In the case of a multi-die IC, an SLL is a wire that couples one die to another die. An SLL is to be distinguished from routing resources (e.g., other wires) used to connect nodes located within a single partition or SLR. Since partitions are allocated to SLRs, a net, as defined herein, when implemented in the target IC, is one that crosses a boundary between two SLRs.

In the example, CAD system 100 is configured to perform a variety of executable operations. In block 106, for example, CAD system 100 is capable of performing a global assignment phase. The global assignment phase may be performed by clustering a plurality of SLLs into a plurality of SLL bins, clustering loads of nets of the circuit design into a plurality of load clusters, and assigning the plurality of SLL bins to the plurality of load clusters. The assigning the plurality of SLL bins to the plurality of load clusters can form a plurality of SLL bin and load cluster pairs. Within this disclosure, given that SLL bins are assigned to particular load clusters (e.g., forming pairs), the SLL bin (load cluster) assigned to a given load cluster (SLL bin) of a pair may be referred to as the "associated" or "assigned" SLL bin (load cluster). As described in greater detail below, a net can have several load clusters. Each load cluster is assigned to an SLL bin. As such, more than one load cluster may be assigned to the same SLL bin. Since a net can have several load clusters, a net may be assigned to more than one SLL bin.

In block 108, the system is capable of performing a detailed assignment phase for each SLL bin. The detailed assignment phase can include, for each net having a load cluster assigned to the SLL bin, assigning one or more particular SLLs of the SLL bin to the net using the computer hardware.

In the example of FIG. 1, CAD system 100 is capable of performing the operations described in connection with blocks 106 and 108 using an Integer Linear Programming (ILP) formulation or formulations.

Figure 2:
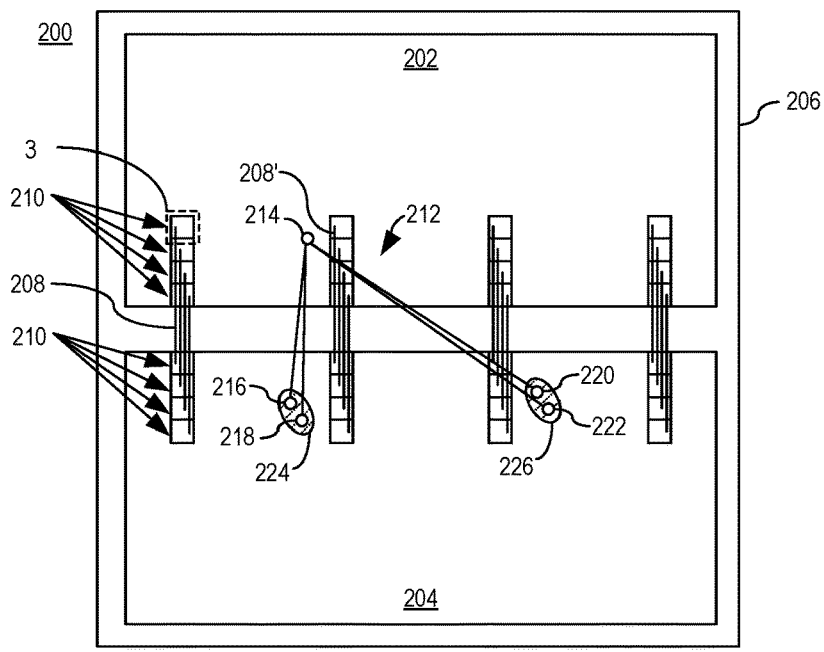
FIG. 2 illustrates an example integrated circuit (IC) in which the circuit design of FIG. 1 may be implemented.

FIG. 2 illustrates an example IC 200 in which circuit design 102 may be implemented. IC 200 includes SLRs 202 and 204. In the example of FIG. 2, each SLR represents a die and is mounted on an interposer 206. Interposer 206 is a larger die to which SLRs 202, 204 are mounted. In the example of FIG. 2, SLRs 202 and 204 are connected by a plurality of SLLs that are implemented within interposer 206. Interposer 206 may provide thousands of SLLs connecting SLR 202 to SLR 204. In general, the SLLs run in different SLL channels and connect nodes located in different SLRs. In this regard, the SLLs are reserved specifically for connecting nodes of nets that span from one die to another.

As noted, circuit design 102 may be partitioned into two partitions where a first partition is assigned to SLR 202 and the second partition is assigned to SLR 204. Circuit design 102 includes one or more nets that cross partition boundaries. In the example of FIG. 2, net 212 of circuit design 102 crosses from SLR 202 to SLR 204. Net 212 includes a driver 214 and loads 216, 218, 220, and 222. CAD system 100 has clustered loads 216 and 218 into a load cluster 224 and clustered loads 220 and 222 into a load cluster 226. Net 212 includes 1 cut corresponding to the crossing from SLR 202 to SLR 204. In general, the term "cut" refers to the boundary between two partitions. Any net that crosses such a boundary has a cut. Net 212 must be routed using particular SLLs to effectuate crossing from one SLR to another.

CAD system 100 is also capable of organizing SLLs into SLL bins 208, where each SLL bin includes and represents a plurality of SLLs. In the example of FIG. 2, SLRs 202 and 204 may include a plurality of circuit blocks (e.g., circuit tiles) arranged largely in a grid. For example, the circuit blocks may implement programmable circuitry (e.g., programmable logic.). In an example implementation, one or both of SLRs 202, 204 may be implemented as an FPGA having a grid programmable circuit or logic blocks. While not all of the circuit blocks are shown, those circuit blocks that connect to SLL endpoints in a same SLL bin 208 are collectively as SLL circuit block groups 210. Each SLL circuit block group 210 includes a plurality of SLL circuit blocks. A circuit block that connects to an SLL endpoint is referred to herein as an SLL circuit block.

Some conventional implementation tools model a multi-partition circuit design as a directed graph where nodes correspond to wires and arcs represent connection points (e.g., programmable connection points in the case of programmable ICs). The conventional implementation tools use graph search algorithms to route all nets of the circuit design (e.g., those that cross partition boundaries and those that do not) without overlaps while minimizing critical path delay. Such implementation tools deal with interposers, e.g., the bottleneck problems, by modeling SLLs as regular nodes in the directed graph and using existing algorithms to iteratively find partition wire assignment of an SLL to a single net.

Modeling SLLs as regular nodes in the directed graph has been favored because no modification of the existing algorithms is required. Still, such conventional implementation tools suffer from several disadvantages. For example, the runtime of conventional implementation tools may increase exponentially due to search space explosion. Further, circuit designs that stress interposer capacity (e.g., have high SLL utilization) may be un-routable by conventional implementation tools as such tools are unable to adequately deal with bottleneck problems. Conventional implementation tools, for example, often sacrifice QOR to keep runtime scalable, which may prevent the implementation tools from meeting user-specified design requirements.

Other types of conventional implementation tools attempt to address search space explosion by determining interposer locations and then using the interposer locations as a hint for performing detailed routing. While these types of implementation tools succeed in reducing the search space, the same routing algorithms described above are applied. As such, while runtime may be reduced, such conventional routers still may be unable to generate a partition wire assignment for a circuit design with high SLL utilization.

In accordance with the inventive arrangements described herein, CAD system 100 is capable of using a global view of the routing problem to be solved where one or more nets of the circuit design may be moved simultaneously. This facilitates faster convergence to a partition wire assignment in less runtime while still achieving greater QOR or little or no loss in QOR compared to conventional implementation tools. The examples described herein represent the routing problem using an ILP formulation or model. In the example implementations, the search space is limited to include only SLLs. Other wires are omitted from consideration. This means that the inventive arrangements described herein provide scalability that may be an order of magnitude greater than conventional routing techniques. Further, the inventive arrangements described herein are capable of generating routing solutions for circuit designs having SLL utilizations of 99% or more.

Referring again to FIG. 2, CAD system 100 is capable of determining an assignment of an SLL to a net that crosses a partition boundary. For example, as noted in connection with block 106, CAD system 100 is capable of assigning net 212 to a particular SLL bin 208 shown as SLL bin 208', having a plurality of SLLs. During a subsequent operation corresponding to block 108, CAD system 100 is capable of assigning net 212 to a particular SLL in SLL bin 208. By applying principles such as load clustering and/or SLL binning described herein, CAD system 100 is capable of assigning SLLs to nets while achieving a reduction in runtime of approximately 40× to 100× compared to conventional implementation tools. Further, circuit designs that were un-routable by conventional implementation tools may be routed. Timing and congestion objectives may be specified and met.

Figure 3:
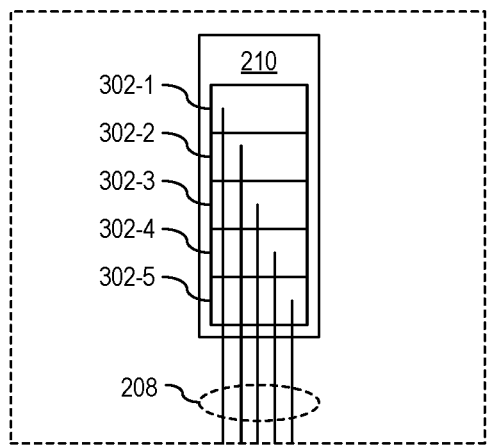
FIG. 3 illustrates a more detailed view of a super-long line (SLL) circuit block group corresponding to an SLL bin.

FIG. 3 illustrates a more detailed view of an SLL circuit block group 210 of corresponding to an SLL bin 208. In the example of FIG. 3, SLL circuit block group 210 includes 5 constituent SLL circuit blocks 302. Each of SLL circuit blocks 302 may couple to an endpoint of each of a plurality of SLLs. For purposes of illustration, each SLL circuit block 302 couples to endpoints of 24 SLLs. Thus, each line descending down from one of blocks 302 represents 24 SLLs. By grouping 5 SLL circuit blocks 302 into SLL circuit block group 210, an SLL bin 208 having 120 SLLs may be created.

Of the SLL circuit blocks 302 shown in FIG. 3, the center SLL circuit block 302-3 or a particular SLL therein may be selected or designated as a "reference SLL" for the SLL bin shown. Circuit block 302-3 represents the median row of circuit blocks 302 forming SLL bin 208 such that the reference SLL may be used for wirelength and/or timing calculations involving the SLL bin shown. It should be appreciated that SLLs may be clustered into SLL bins that include more or fewer circuit SLL circuit blocks 302 and/or SLLs. At the opposing end of each SLL of the SLL bin shown, a same configuration is implemented in the other SLR with respect to the SLL circuit block group 210 implemented therein. Further, a reference SLL in the SLL circuit block group 210 implemented in SLR 204 may be selected for purposes of wirelength and/or timing calculations. The example of FIG. 3, including the number of SLL circuit blocks 302 included in SLL circuit block group 210 and the number of SLLs connected to an SLL circuit block 302 are provided for purposes of illustration and not limitation.

Figure 4:
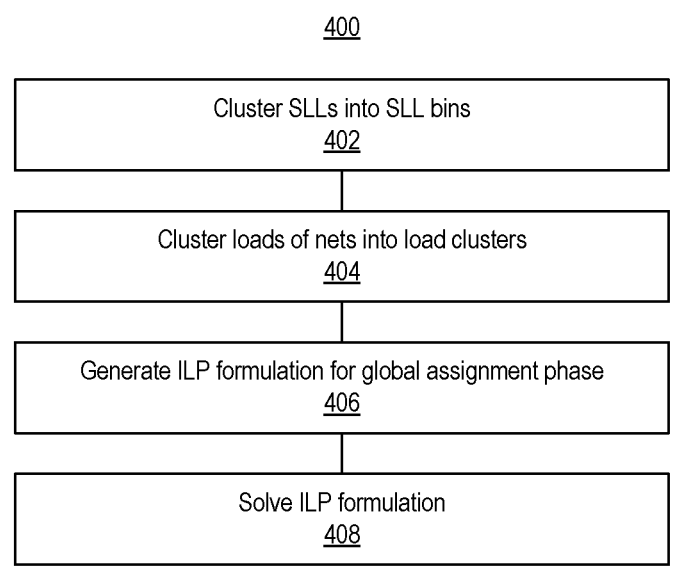
FIG. 4 illustrates an example method of performing the global assignment phase of FIG. 1.

FIG. 4 illustrates an example method 400 of performing the global assignment phase corresponding to block 106 of FIG. 1. In block 402, CAD system 100 clusters SLLs of the target IC into SLL bins 208 as described in connection with FIGS. 2 and 3. By clustering SLLs into SLL bins 208, the search space for determining a partition wire assignment may be significantly reduced. The number of options for assigning SLLs to nets may be reduced in accordance with the number of SLLs that are included in the respective SLL bins 208. For example, generating SLL bins as described provides a reduction in the search space of approximately 100×.

While SLL binning significantly reduces the search space, the SLL binning has little or no effect the quality of the resulting partition wire assignment. For example, any error that may be introduced from the global assignment phase to the detailed assignment phase may be limited to the distance between SLL circuit block 302-3, e.g., the reference SLL, and the end circuit blocks 302-1 or 302-5.

In block 404, the system clusters loads of nets into load clusters. Clustering loads of nets is described in greater detail in connection with FIG. 5. In block 406, CAD system 100 generates an ILP formulation for the global assignment phase. The ILP formulation accounts for the SLL bins generated in block 402 and the load clusters created in block 404. In block 408, CAD system 100 solves the ILP formulation thereby generating an assignment of the plurality of SLL bins 208 to the plurality of load clusters.

As described herein, ILP formulations may be specified as data structures including a plurality of different variables and constraints that define the routing problem. The ILP formulation of the global assignment phase may optionally account for one or more other operations such as cluster merging and one or more optimizations such as wirelength optimization, congestion optimization, and/or timing optimization. An ILP solver capable of solving the ILP formulations described herein while also minimizing the cost(s) may be incorporated into CAD system 100. An example of an ILP solver is the Gurobi Optimizer.

Figure 5:
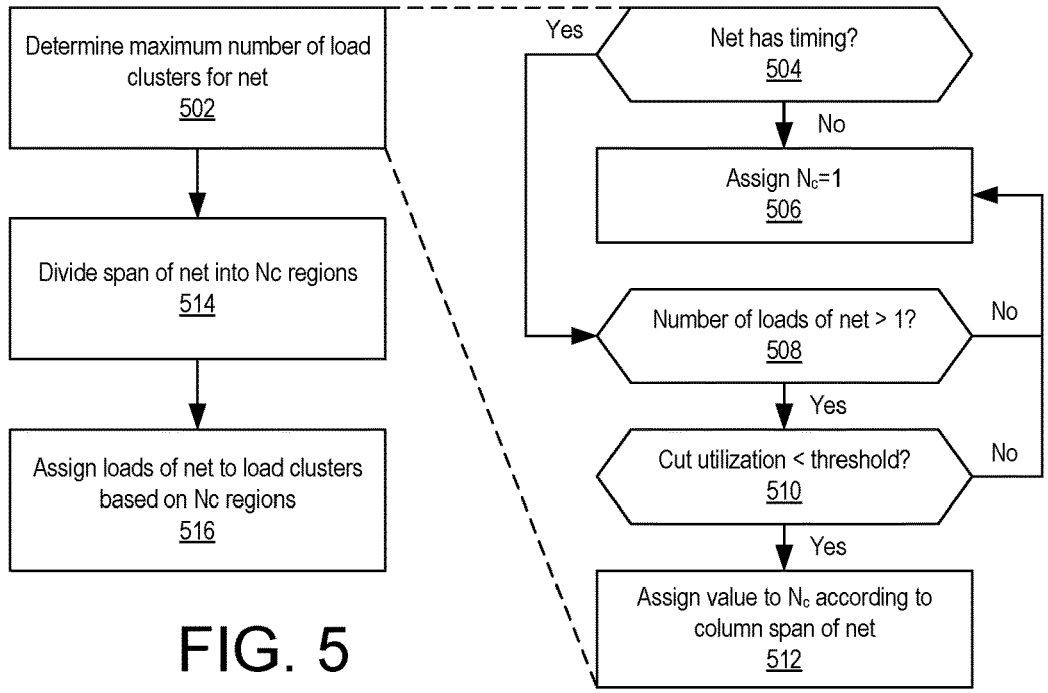
FIG. 5 illustrates an example method of clustering loads of nets.

FIG. 5 illustrates an example method 500 of clustering loads of nets as performed in block 404 of FIG. 4. Method 500 implements a proximity-based clustering technique for clustering loads of nets. Method 500 illustrates the processing performed for a single net. It should be appreciated that method 500 may be iterated as need to process each of the nets that span two or more partitions.

In block 502, CAD system 100 determines a maximum number of load clusters for a net. The maximum number of load clusters may be denoted as $N_c$. When clustering loads of a net, $N_c$ is the maximum number of load clusters that may be created for that net. The maximum number of load clusters is specific to each net. Blocks 504-512 illustrate an example technique for estimating the maximum number of load clusters $N_c$ that may be created for the net.

In block 504, CAD system 100 determines whether the net has one or more timing constraints. Example timing constraints detected by CAD system 100 may include, but are not limited to, clock period constraints, data path constraints, and input/output (I/O) constraints. The timing constraints typically pertain to, or cover, signal paths including one or more flip-flops. Each net that is part of such a path will have a timing constraint (e.g., one or more timing requirements and/or one or more slacks) associated therewith. In response to determining that the net does not have a timing constraint, method 500 continues to block 506 where CAD system 100 sets $N_c=1$ for the net. In response to determining that the net has a timing constraint, method 500 continues to block 508.

In block 508, CAD system 100 determines whether the number of loads of the net is greater than 1. In response to determining that the number of loads of the net is not greater than one (e.g., the net has a single load), method 500 continues to block 506 where CAD system 100 sets $N_c=1$ for the net. In response to determining that the number of loads of the net is greater than one, method 500 continues to block 510.

In block 510, CAD system 100 determines whether the cut utilization is less than a predetermined threshold. CAD system 100 is capable of determining the cut utilization by dividing the number of nets that cross from a particular SLR to another particular SLR (e.g., SLR 202 to SLR 204 corresponding to one cut) by the number of SLLs that connect the two SLRs (e.g., the number of SLLs connecting SLR 202 to SLR 204). In an example implementation, the threshold is set to 0.8. It should be appreciated that the threshold may be lowered or raised depending on the desired number of load clusters. In response to determining that the cut utilization does not exceed the threshold, method 500 continues to block 506 where CAD system 100 sets $N_c=1$ for the net. In response to determining that the cut utilization does exceed the threshold, method 500 continues to block 512.

In block 512, CAD system 100 is capable of assigning a value to $N_c$ based on the column span of the net. CAD system 100 is capable of assigning a value to $N_c$ for the net based on Expression 1 below.

$$N_c = \frac{(\text{Column Span}) \times (\text{Maximum Clusters})}{\text{Maximum SLL Span}} \quad (1)$$

In Expression 1, the column span is the number of SLL channels spanned by the net. Referring to the example of FIG. 2, net 212 has a column span of 2 in that the connections from driver 214 to load 222 crosses two SLL channels. An SLL channel is formed by the plurality of SLL circuit block groups 210 in a same column in an SLR. In another aspect, CAD system 100 generates a bounding box for the net and determines the column span as the number of SLL channels covered by the bounding box in the horizontal direction (at least with respect to the orientation of FIG. 2). The "Maximum SLL Span" is the number of SLL channels connecting the two SLR regions in which net 212 is implemented. In this example, the value of maximum SLL span is 4. The "Maximum Clusters" refers to the maximum number of SLLs that can be used by any given net. In the example, the "Maximum Clusters" is set equal to 5.

For purposes of illustration, consider example net 212. Block 512 calculates the value of $N_c$ for net 212 to be 2, where Column Span=2, Maximum Clusters=5, and Maximum SLL span=4. The value $N_c$ may be rounded down. Expression 1 ensures that in cases where a net covers a large area, more load clusters are created for the net to account for the possibility of multiple SLLs to better account for timing and congestion.

In block 514, CAD system 100 divides the span of the net into $N_c$ different sub-regions. Referring again to example net 212 where the value of $N_c$ is 2, CAD system 100 divides the span of the net into 2 different sub-regions. Referring to FIG. 2, a bounding box surrounding the loads of net 212 within SLR 204 is divided into 2.

In block 516, CAD system 100 assigns loads of the net to load clusters based on the $N_c$ sub-regions that were created in block 514. For example, CAD system 100 generates a load cluster for each sub-region, where the load cluster includes each load located in the sub-region. Accordingly, CAD system 100 creates one load cluster for each sub-region that includes at least one load of the net.

The following discussion describes example ILP formulation(s) that may be generated using CAD system 100 to implement block 406 of FIG. 4. CAD system 100 may generate one or more constraints that ensure that every load cluster is assigned to an SLL bin. In this example, the circuit design includes N nets $n_i$, $\forall i=1, \ldots N$; $c_j$ load clusters for every net, $\forall j=1, \ldots C$; $b_k$ SLL bins are generated for the target IC, $\forall k=1, \ldots B$; then CAD system 100 is capable of creating binary variables $x_{n_i c_j b_k}$ to represent whether cluster $c_j$ of net $n_i$ is assigned to SLL bin $b_k$. The number of binary variables created for each net is C×B. If there are N nets in total, the total number of variables created is N×C×B.

Expression 2 below illustrates an example implementation of a constraint that ensures that every load cluster of every net is assigned to an SLL bin.

$$\forall n_i, i = 1, \ldots N \forall c_j, j = 1, \ldots C \sum_{k=1}^{B} x_{n_i c_j b_k} = 1 \quad (2)$$

CAD system 100 may generate one or more constraints ensuring that every SLL bin only gets nets assigned thereto up to the capacity of the SLL bin. Further, given that a single net may have multiple load clusters, it is possible that more than one load cluster of a given net may be assigned to a same SLL bin. For this reason, in an example implementation, constraints may be generated that facilitate load cluster merging. Merging load clusters ensures that, in the partition wire assignment generated as the final solution by the detailed assignment phase, only 1 SLL is assigned to all clusters of a given net located within the same load cluster.

Performing load cluster merging helps to ensure that SLL capacity is not violated. For example, if the total number of load clusters of all nets exceeds the total SLL capacity (e.g., total number of SLLs on the target IC), multiple load clusters of a particular net would need to be assigned to the same SLL bin to fit within the available SLL capacity. In computing wirelength of a net, if multiple load clusters are assigned to the same SLL bin, the load cluster merge operation in the ILP formulation may be used to accurately compute wirelength as illustrated below in greater detail.

Figure 6:
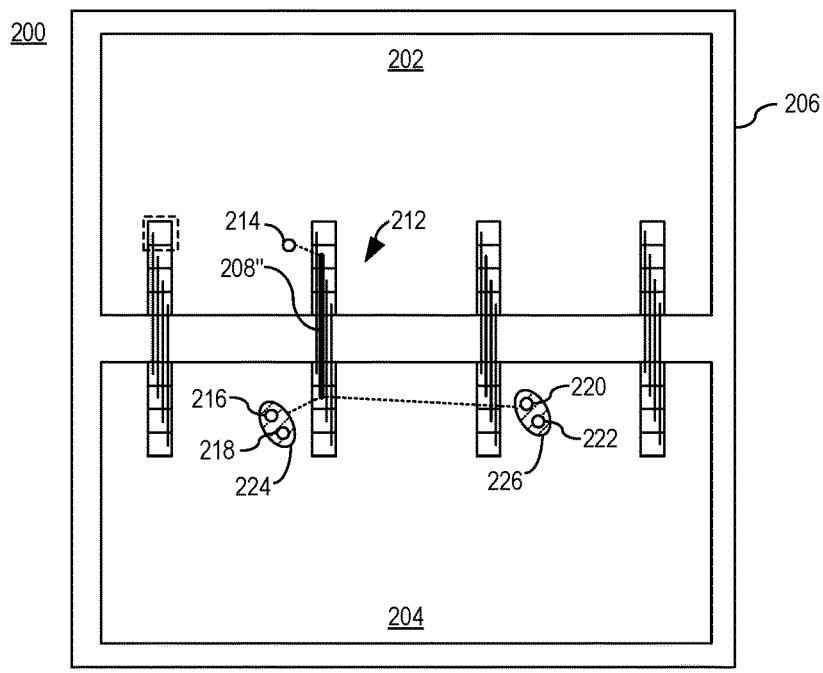
FIG. 6 illustrates an example of a load cluster merge operation.

FIG. 6 illustrates an example of a load cluster merge operation. In the example of FIG. 6, load clusters 224 and 226 are assigned to a same SLL bin 208''. Connections from driver 214 to SLL bin 208'' and from SLL bin 208'' to load clusters 224 and 226 are shown as dashed lines. SLL bin 208'' is shown bolded. It should be appreciated that in the examples described herein, a particular SLL bin defines both SLL circuit block groups 210 that are used. That is, each SLL connects to an SLL circuit block 302 at each endpoint. In this sense, the designation of any particular SLL or SLL bin inherently defines the endpoints (e.g., or SLL circuit block group 210 in the case of an SLL bin) within the different SLRs connected by the SLL or SLL bin as the case may be.

To support cluster merging in the ILP formulation, CAD system 100 uses new variables $x_{n_i b_k}$ to represent assignment of any load cluster of a net $n_i$ to bin $b_k$. If any cluster $c_i$ of net $n_i$ is assigned to bin $b_k$, $x_{n_i b_k}$ is set to 1. Examples of the cluster merge constraints are shown below as expressions (3) and (4).

$$\forall c_j, j = 1, \ldots C x_{n_i b_k c_j} \leq x_{n_i b_k} \quad (3)$$

$$-N_c \times x_{n_i b_k c_j} + \sum_{j=1}^{C} x_{n_i b_k c_j} \leq 0 \quad (4)$$

Expression 3 ensures that if no load cluster is assigned to bin $b_k$, then $x_{n_i}b_k$ is set to 0. Expression 4 ensures that if one or more load clusters $c_1$ are assigned to bin $b_k$, then $x_{n_i}b_k$ is set to 1.

CAD system 100 may define capacity constraints in accordance with Expression 5 to ensure that no SLL bin is assigned more nets than the capacity allows.

$$\forall b_k k = 1, \ldots B \sum_{i=1}^{N} x_{n_i b_k} \leq BinCapacity[k] \quad (5)$$

In the example implementation described herein in relation to IC 200, the upper bound of BinCapacity[k] of an SLL bin is related to the number of rows of SLL circuit blocks 302 that are clustered to form the SLL bins. As noted, 5 rows of SLL circuit blocks 302 are clustered, where each SLL circuit block 302 includes or has 24 SLLs. Accordingly, the BinCapacity[k] in this example is 120. It should be appreciated, however, that the actual number may depend on utilization and/or congestion optimization(s), if utilized, as explained below. As illustrated, the new variables $x_{n_i b_k}$ are used for purposes of determining BinCapacity[k] so as to count multiple load clusters belonging to a same net and assigned to a same SLL bin as one load cluster rather than multiple load clusters.

CAD system 100 may optionally define one or more constraints for inclusion in the ILP formulation for use in implementing the example optimizations described herein. As noted, the example optimizations may include, but are not limited to, wirelength optimization, congestion optimization, and/or timing optimization.

Figure 7:
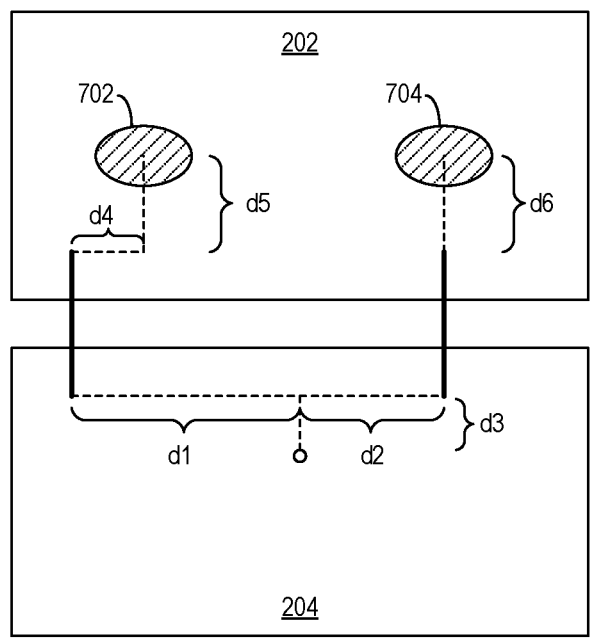
FIG. 7 illustrates an example of wirelength optimization.
Figure 7:
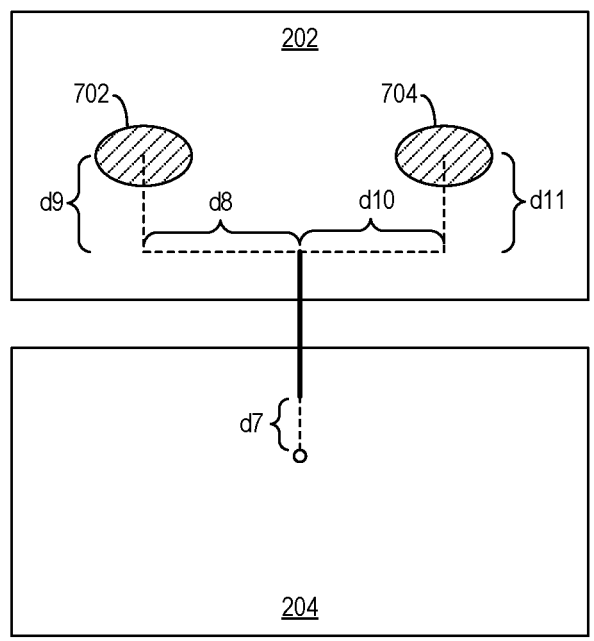

FIG. 7 illustrates an example of wirelength optimization. In the example of FIG. 7, the net has two load clusters 702, 704. The top implementation of the net is pre-wirelength optimization and shows the case where load clusters 702, 704 have been assigned to different SLL bins. In consequence, the top implementation of the net starts in SLR 204 and extends to load clusters 702, 704 in SLR 202 by way of two SLLs. The wirelength of the top implementation of the net may be determined as d1+d2+d3+d4+d5+d6.

The bottom implementation of the net is post-wirelength optimization and shows the case where load clusters 702, 704 are assigned to the same SLL bin. The bottom illustration of the net starts in SLR 204 and extends to load clusters 702, 704 in SLR 202 by way of a single SLL. The wirelength of the bottom implementation of the net may be determined as d7+d8+d9+d10+d11. The bottom implementation has a lower wirelength than the top implementation. Further, the bottom implementation uses fewer SLLs.

CAD system 100 is capable of generating one or more constraints to optimize wirelength as illustrated in the example of FIG. 7. CAD system 100 is capable of calculating the wirelength for every possible assignment of a given SLL bin for a net. CAD system 100 further is capable of weighting each net-SLL bin assignment solution by a variable corresponding to the wirelength of the solution. For example, in the bottom implementation of FIG. 7, if the net $n_i$ is assigned to bin $b_k$, the wirelength may be calculated as $(d7+d8+d9+d10+d11) \times x_{n_i b_k}$. In this example, to accurately compute wirelength, the new variables described in connection with cluster merging are used. Were the other variables (e.g., $x_{n_i b_k c_1}$ and $x_{n_i b_k c_2}$) used, the wirelength contribution of d1 would be double counted.

CAD system 100 is capable of generating one or more constraints to implement the wirelength optimization illustrated above using Expressions 6 and 7.

$$WL_{n_i} = \sum_{k=1}^{B} d_{n_i b_k} \times x_{n_i b_k} \quad (6)$$

-continued $$WL = \sum_{i=1}^{n} WL_{n_i} \quad (7)$$

The overall wirelength is captured by WL. The $d_{n_i b_k}$ terms are constants corresponding to wirelength of net $n_i$ if assigned to bin $b_k$.

Figure 8:
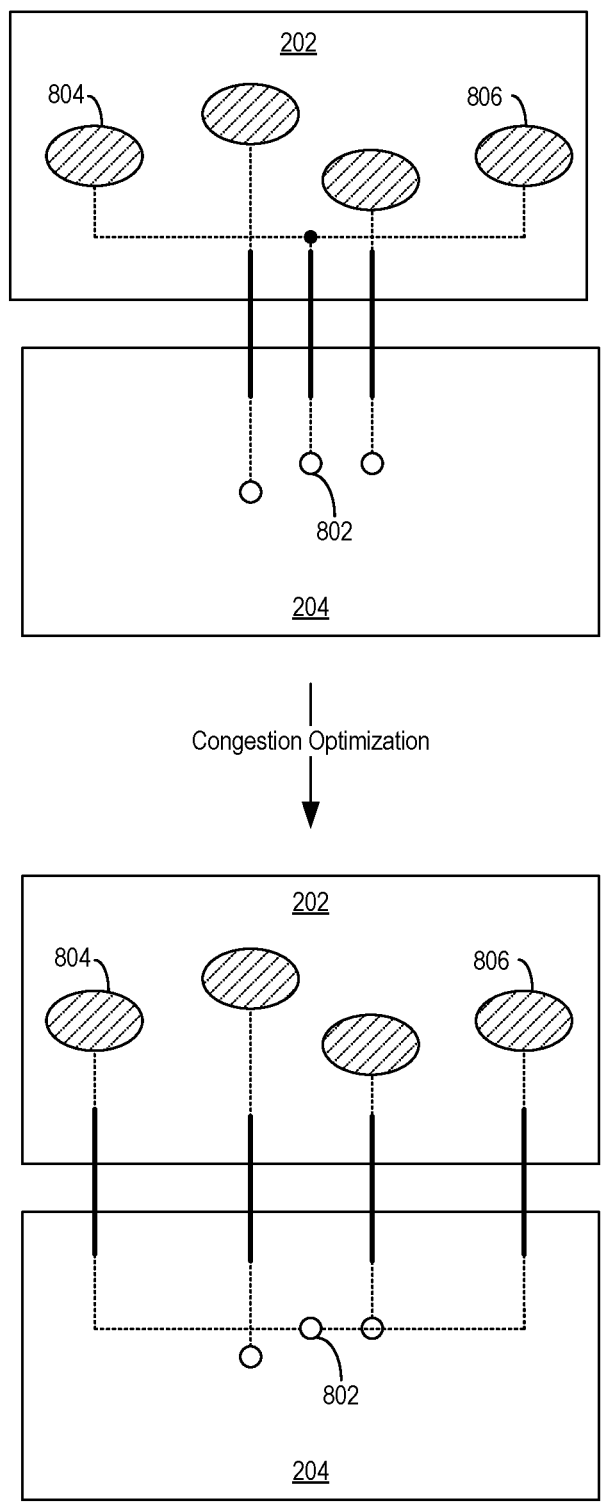
FIG. 8 illustrates an example of congestion optimization.

FIG. 8 illustrates an example of congestion optimization. In the example of FIG. 8, a plurality of nets are shown. The top implementation of the nets is pre-congestion optimization and shows the case where each net uses one SLL. In this example, the net corresponding to load clusters 804, 806, being driven by node (e.g., driver) 802, were in the same SLL bin. Minimizing total wirelength generally produces an assignment where the SLLs assigned to nets are all on shortest paths to the load clusters as shown in the top implementation of FIG. 8. This is often desirable.

In certain cases, however, wirelength optimization may create problems by creating routing congestion as also illustrated in the top implementation shown in FIG. 8. In the top implementation of FIG. 8, the three nets utilize SLLs that are close to one another resulting in congestion in the circuitry surrounding the respective SLL circuit blocks corresponding to the used SLLs. Given that all the SLLs shown in the top implementation are near the center of IC 200 and in the same vicinity, this can create routing congestion for later routing operations using the interposer.

In the bottom implementation of FIG. 8, post-congestion optimization, the net including node 802, which was previously assigned a single SLL in the top implementation, is now assigned two SLLs. In this example, load clusters 804 and 806 are not merged. Rather, load clusters 804 and 806 are assigned to different SLL bins. While the bottom implementation has a higher wirelength than the top implementation, the bottom implementation spreads out the SLLs and reduces the maximum demand for SLLs in the center area of IC 200 from 3 to 2. From a routing congestion standpoint, the bottom implementation provides a better solution than the top implementation. FIG. 8 illustrates how using multiple SLLs for a single net may provide advantages.

CAD system 100 is capable of applying congestion optimization by controlling the capacity of each SLL bin. By varying the allowed capacity of an SLL bin, CAD system 100 is capable of spreading the SLLs. Controlling SLL bin capacity also indirectly controls the number of SLLs used per net and the extent that cluster merging is performed.

If the demand for SLLs in a region is high, a larger SLL bin capacity may be set for all SLL bins in that region, though still subject to the maximum allowed for the target IC. If the demand for SLLs in the region is low, a smaller SLL bin capacity may be used for the SLL bins in that region to achieve more spreading of SLLs that reduce congestion. In this example, a region may include one or more SLL bins. The demand for routing resources near the endpoints of SLLs of the SLL channels may also influence capacity of SLL bins. If the demand for such non-SLL routing resources is high (e.g., a congestion above a predetermined threshold), then access to and from the SLL bins may be difficult to accommodate. In such a scenario, reducing the effective SLL bin capacity may help reduce the routing congestion. In an example implementation, congestion optimization may be regulated by raising or lowering BinCapacity[k]. As noted, the value assigned to BinCapacity[k] is less than the maximum allowed for the target IC and for the SLL bin $b_k$.

Figure 9:
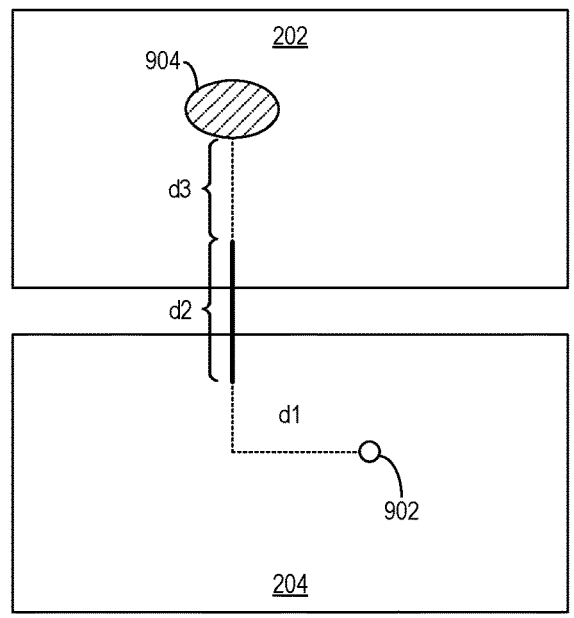
FIG. 9 illustrates an example of timing optimization.

FIG. 9 illustrates an example of timing optimization. In the example of FIG. 9, for each load cluster, CAD system 100 tracks the most timing critical pin of the load cluster. For example, in the net illustrated in FIG. 9 having driver 902 and load cluster 904, CAD system 100 tracks the most timing critical path of the plurality of loads (e.g., pins) in load cluster 904. Each pin in load cluster 904 has a timing budget. CAD system 100 must determine an assignment to an SLL bin that meets the timing budget of each pin in load cluster 904. The most timing critical pin is the pin with the smallest timing budget.

In the example of FIG. 9, d1 represents the estimated delay from driver 902 to the entry endpoint of the reference SLL of the SLL bin, d2 represents the estimated delay of the reference SLL itself of the SLL bin, and d3 represents the estimated delay from the exit endpoint of the reference SLL to the most critical pin of load cluster 904. CAD system 100 is capable of translating the budget violation into a criticality metric. The criticality metric may be specified as an integer value between 0 and 255, where 0 is the least timing critical and 255 is the most timing critical. In an example implementation, CAD system 100 translates the budget violation into an integer value using Expression 8.

$$\text{Criticality} = \frac{(\text{Budget Violation of Pin} - \text{Minimum Budget Violation}) \times 255}{(\text{Maximum Budget Violation} - \text{Minimum Budget Violation})} \quad (8)$$

In the example of Expression 8, the minimum budget violation and the maximum budget violation are the minimum and maximum budget violations across all pins of nets including both cut nets that span partitions or SLRs and nets that do not span partitions or SLRs in the circuit design. By considering minimum and maximum budget violations across all nets, CAD system 100 is better able to differentiate the relative timing importance of one cut net with respect to another. If the cut net is not timing critical when compared to other "non-cut" nets in the design, the criticality of the cut net would be a smaller number promoting more flexibility in the optimization to trade-off wirelength, utilization, congestion with timing.

CAD system 100 is capable of generating one or more constraints to implement the timing optimization illustrated above using Expressions 9 and 10.

$$T_{n_i} = \sum_{j=1}^{C} \sum_{k=1}^{B} t_{n_i c_j b_k} \times x_{n_i b_k c_j} \quad (9)$$

$$T = \sum_{i=1}^{n} T_{n_i} \quad (10)$$

In Expression 9, the term $t_{n_i c_j b_k}$ represents the timing cost for assigning cluster j of net $n_i$ to SLL bin $b_k$ and may be calculated as described above.

Figure 10:
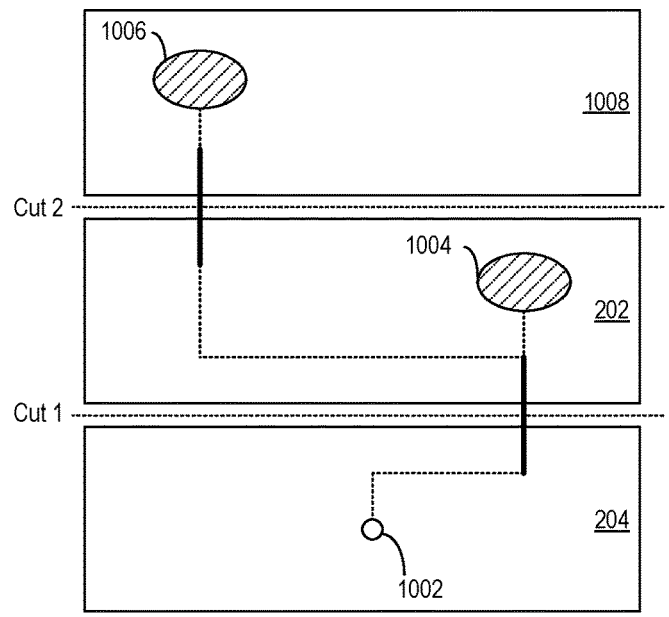
FIG. 10 illustrates an example net that spans more than two partitions.

The examples described within this disclosure may also be used in cases with more than one cut, e.g., where the target IC includes more than two SLRs. FIG. 10 illustrates an example net that spans more than two partitions. In the example of FIG. 10, the net starts from a driver 1002 in SLR 204, continues to a load cluster 1004 in SLR 202, and on to a load cluster 1006 in SLR 1008. The examples described herein may be extended to the multi-cut device case by generating an ILP formulation for one cut at a time and solving that ILP formulation prior to moving to a next cut. CAD system 100 may iterate until a solution is generated for each cut of the circuit design (or target IC).

In general, the order in which cuts are processed may impact the QOR achieved since each assignment generated for a cut imposes restrictions on subsequently generated assignments for other cuts. In one aspect, CAD system 100 may process cuts in an order determined by utilization of SLLs. Those cuts having the highest SLL utilization may be considered more difficult to solve. SLL utilization may be determined as the number of SLLs connecting two SLRs divided by the number of nets that cross between the two SLRs or cross the cut. Thus, processing such cuts earlier rather than later allows CAD system 100 to process the more difficult cut with the fewer restrictions. In an example implementation, CAD system 100 may process cuts in an order of highest SLL utilization to lowest SLL utilization. In another example implementation, CAD system 100 may select the cut with the highest SLL utilization and then select cuts by moving either up or down along the target IC to the next cut.

Referring again to FIG. 10, the example net, in crossing or spanning more than two SLRs (e.g., having two or more cuts), illustrates a case where CAD system 100 may apply special handling. For purposes of illustration, the order in which the cuts are processed by CAD system 100 is cut 1 followed by cut 2. In this scenario, CAD system 100 will generate an assignment of an SLL to the net in an SLL bin that is optimum for load cluster 1004, which may lead to a sub-optimal SLL assignment to continue the net to load cluster 1006.

In an example implementation, load cluster propagation may be used to address the scenario illustrated in FIG. 10. Load cluster propagation also may be used to address cases where a net spans more than two SLRs and the intervening SLR(s) include no loads. For example, driver 1002 may be located in SLR 204, SLR 202 includes no load clusters (e.g., no loads), and SLR 1008 includes both load clusters 1004 and 1006. Load cluster propagation provides a mechanism for projecting loads from one SLR into another SLR to generate an assignment for a cut.

Figure 11:
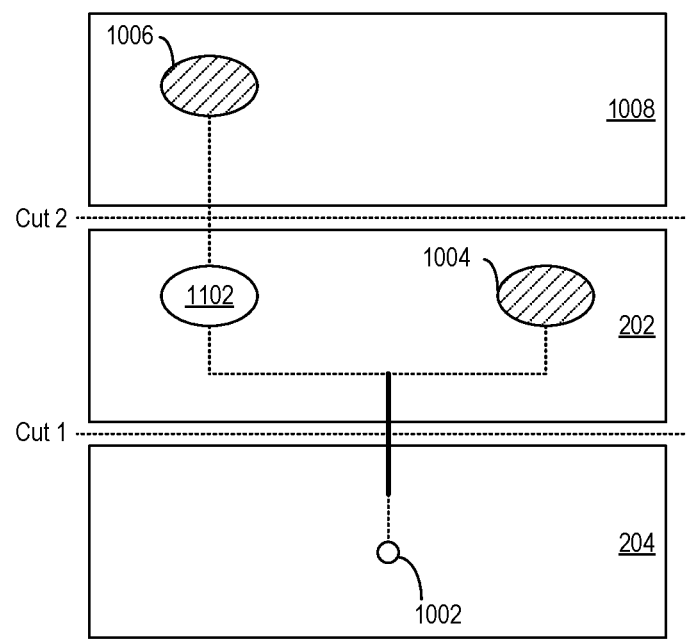
FIGS. 11 and 12 illustrate load cluster propagation.

FIG. 11 illustrates an example of load cluster propagation where load cluster 1006 is projected from SLR 1008 to a location in SLR 202. The load cluster propagation illustrated assumes that cut 1 is processed prior to cut 2. The projection of load cluster 1006 is shown within SLR 202 as projection 1102. Projection 1102 is located in the same relative location in SLR 202 as load cluster 1006 is located in SLR 1008. For purposes of generating an assignment for cut 1, projection 1102 is considered a valid load cluster along with load cluster 1004, while load cluster 1006 is ignored. Performing load cluster projection allows CAD system 100 to optimize the location of the SLL for cut 1. In the example, CAD system 100 still may use the actual locations of the loads in load cluster 1006 (e.g., in SLR 1008) for purposes of computing wirelength and timing costs.

Figure 12:
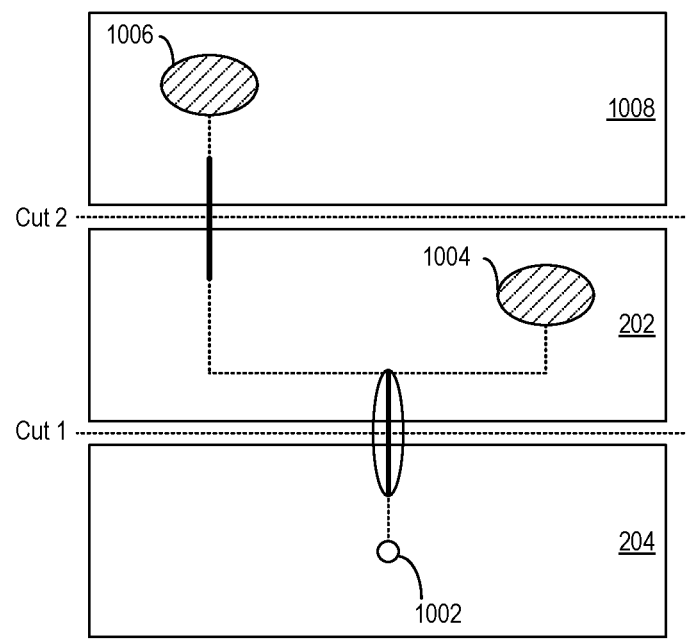

Once an assignment is generated for cut 1, CAD system 100 propagates driver 1002 to the actual SLL bin that was assigned as illustrated in the example of FIG. 12. FIG. 12 also illustrates that projection 1102 is removed (e.g., deleted). The SLL bin (e.g., the endpoint of the reference SLL of the SLL bin located in SLR 202) is used as the driver of the net for generating an assignment for cut 2. This process ensures that the wirelength and congestion costs are accurately accounted for.

CAD system 100 is capable of solving the ILP formulation as described in connection with block 106 to assign nets to SLL bins. CAD system 100, for example, is capable of solving the ILP formulation, formed using Expressions 2-10 to minimize the cost function illustrated as Expression 11 below.

$$\text{Cost}=WL+T \quad (11)$$

As discussed, CAD system 100 is capable of performing the global assignment phase corresponding to block 106 iteratively for each cut according to one of the cut ordering heuristics described herein. In response to generating an assignment of SLL bins to load clusters for each cut, CAD system 100 uses the assignments generated for each cut to begin the detailed assignment phase corresponding to block 108 to assign nets to particular SLLs.

Figure 13:
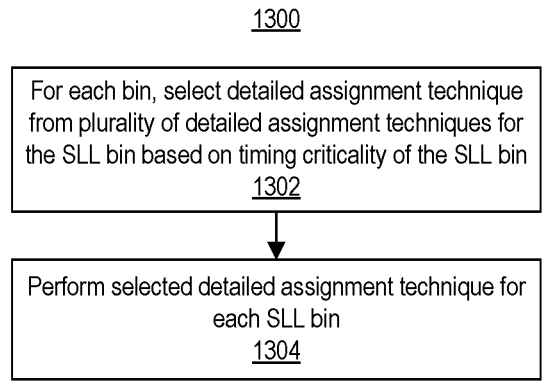
FIG. 13 illustrates an example method of implementing the detailed assignment phase of FIG. 1.

FIG. 13 illustrates an example method 1300 of implementing block 108 of FIG. 1 (e.g., the detailed assignment phase). In the detailed assignment phase, CAD system 100 distributes each net to individual, or particular, SLLs in the various SLL bins. At the conclusion of the detailed assignment phase, there is a final assignment of SLLs to nets. In the detailed assignment phase, CAD system 100 uses a local view of the nets and the SLL bins. CAD system 100 does not permit net to SLL bin assignments to change. As a result, CAD system 100 is capable of performing method 1300 in parallel across the SLL bins to reduce runtime.

In block 1302, for each SLL bin, CAD system 100 is capable of determining a particular detailed assignment technique to be used to assign nets to particular SLLs of the SLL bin associated with the net. CAD system 100 is capable of selecting the selected detailed assignment technique from a plurality of detailed assignment techniques based on timing criticality of the SLL bin. In an example implementation, timing criticality of the SLL bin may be determined using a selected SLL of the SLL bin (e.g., the reference SLL) to represent timing characteristics of each SLL of the SLL bin.

A different detailed assignment technique is selected based on whether the SLL bin is timing critical. The selection of a particular detailed assignment technique may be performed on a per-SLL bin basis. In response to determining that the SLL bin is timing critical (e.g., one or more nets do not meet timing using the reference SLL), CAD system 100 selects a detailed bin-level ILP technique. In response to determining that the SLL bin is not timing critical, CAD system 100 selects a greedy wirelength driven assignment technique. Block 1302 enables CAD system 100 to select the appropriate detailed assignment technique for each SLL bin on a per-SLL bin basis. Thus, one or more SLL bins may be processed using the greedy wirelength driven assignment technique while one or more other SLL bins may be processed using the detailed bin-level ILP technique based on whether the bin is considered timing critical.

In block 1304, CAD system 100 performs the selected detailed assignment technique for each SLL bin. In an example implementation, having completed the global phase, the detailed phase may be performed in parallel. That is, CAD system 100 is capable of performing the detailed assignment phase described in connection with FIG. 13 for the SLL bins in parallel (e.g., concurrently) since the final assignment solution for any given SLL bin is not affected by the final assignment solution for any other SLL bin.

In general, the greedy wirelength driven assignment technique is capable of operating faster (e.g., less runtime) than the detailed bin-level ILP technique. With the greedy wirelength driven assignment technique, CAD system 100 attempts to satisfy a first objective of minimizing wirelength perturbation of the overall solution and a second objective of distributing nets to individual SLLs in a way that equalizes the demand of routing to SLLs in the general interconnect fabric (e.g., programmable circuitry). CAD system 100 is capable of first pre-computing the wirelength displacement of assigning a net to each SLL of the SLL bin. The wirelength displacement may be calculated by determining the differential in wirelength in assigning a net to a particular SLL from using the reference SLL. CAD system 100 may then sort the nets based on descending order of wirelength displacement and assign nets to SLLs in that order to minimize wirelength displacement.

To control utilization of each SLL circuit block, CAD system 100 may incorporate utilization targets and costs for the SLL circuit blocks. This is done to alleviate congestion and accomplishes a sort of interleaved SLL assignment where CAD system 100 does not fill-up certain SLL circuit blocks completely before moving to the next SLL circuit block. The utilization costs imposed by CAD system 100 allow SLL circuit blocks of the SLL bin to be gradually filled to ease congestion. Once CAD system 100 sets up the costs, CAD system 100 orders possible choices of SLLs for each net and then greedily assigns nets to SLLs (e.g., and SLL circuit blocks) based on this order subject to utilization constraints for each SLL circuit block.

Figure 14:
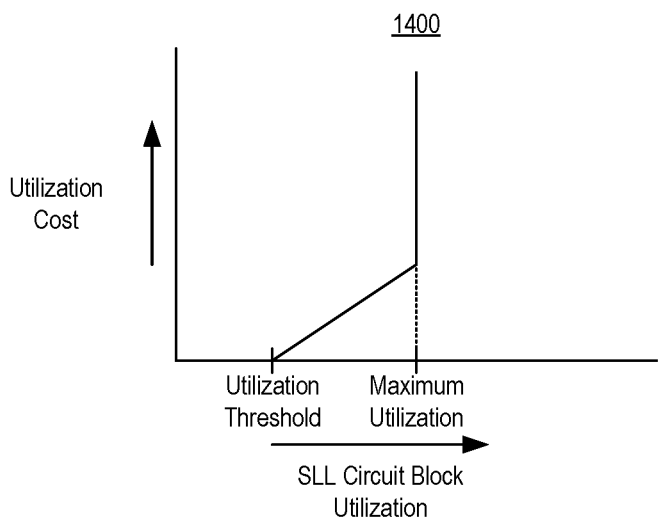
FIG. 14 illustrates an example of utilization costs using the greedy wirelength driven assignment technique.

FIG. 14 illustrates the imposition of utilization costs by CAD system 100 for an SLL circuit block with the greedy wirelength driven assignment technique. As shown, the utilization cost begins to increase at a particular point referred to as the utilization threshold and continues to increase at a constant rate until the maximum utilization is reached. At the maximum utilization, the utilization cost for using the SLL circuit block goes infinitely high so that no further nets may be assigned to the SLL circuit block.

In the case of the detailed bin-level ILP technique, CAD system 100 creates an ILP formulation that minimizes a timing cost in addition to the wirelength cost and the SLL circuit block utilization cost described in connection with the greedy wirelength driven assignment technique. CAD system 100 may compute the timing cost in the same way that the timing cost is calculated for SLL circuit blocks with the exception that the timing cost is calculated for each SLL of the SLL bin rather than just for the reference SLL of the SLL bin. CAD system 100, using the wirelength, timing, and utilization costs, generates an ILP formulation as a linear bottleneck assignment problem using a bi-partite graph.

Figure 15:
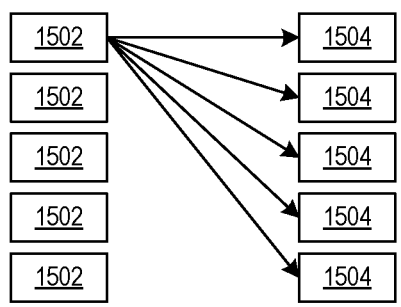
FIG. 15 illustrates an example implementation of the detailed bin-level Integer Linear Programming (ILP) technique.

FIG. 15 illustrates operation of the detailed bin-level ILP technique. FIG. 15 illustrates nets 1502 having been assigned to an SLL bin. Nets 1502 are assigned to particular SLLs 1504 of the SLL bin. Appreciably, the number of nets and SLLs illustrated in FIG. 15 is for purposes of illustration and not limitation. The actual number of nets and/or SLLs may be higher or lower depending on the particular implementation of the inventive arrangements described herein and the target IC architecture. CAD system 100 is capable of assigning nets 1502 to particular SLLs based on the cost of assigning a net n to an SLL t based on Expression 12 below.

$$\text{Cost}_{nt} = T_{nt} + WL_{nt} + \text{Utilization}_{nt} \quad (12)$$

CAD system 100 is capable of solving the ILP formulation by minimizing the total cost for the SLL bin calculated using the Expression 12.

Like in the greedy wirelength driven assignment technique, the detailed bin-level ILP formulations for the respective SLL bins may be solved by CAD system 100 in parallel. Whether using the greedy wirelength drive assignment technique or the detailed bin-level ILP assignment technique, at the conclusion, nets are assigned to individual SLLs.

The example implementations described within this disclosure provide significant performance improvements over conventional routing and/or assignment techniques. CAD system 100, for example, is capable routing circuit designs that conventional routers are unable to route, e.g., circuit designs with utilizations that exceed 99%. Further, CAD system 100 is capable of providing an average increase in speed of approximately 40-113 times that of conventional techniques. CAD system 100 is capable of achieving these results while also providing a QOR with respect to timing that is on par with other available routing techniques.

Figure 16:
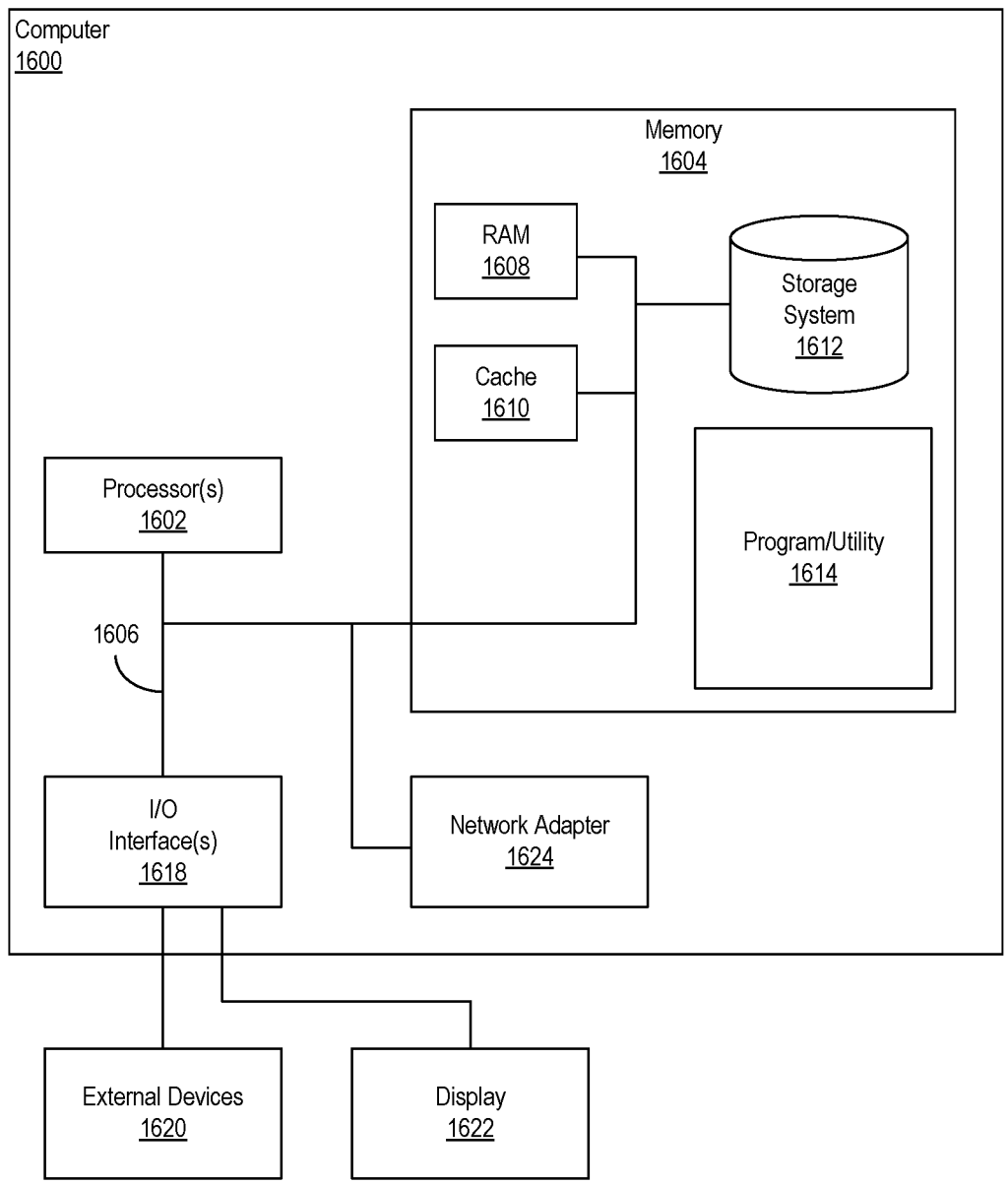
FIG. 16 illustrates an example computer for use in implementing a CAD system.

FIG. 16 illustrates an example computer 1600. As shown in FIG. 16, the components of computer 1600 can include, but are not limited to, a processor 1602, a memory 1604, and a bus 1606 that couples various system components including memory 1604 to processor 1602. Processor 1602 may be implemented as one or more processors. In an example, processor 1602 is implemented as a central processing unit (CPU). Example processor types include, but are not limited to, processors having an x86 type of architecture (IA-32, IA-64, etc.), Power Architecture, ARM processors, and the like.

Bus 1606 represents one or more of any of a variety of communication bus structures. By way of example, and not limitation, bus 1606 may be implemented as a Peripheral Component Interconnect Express (PCIe) bus. Computer 1600 typically includes a variety of computer system readable media. Such media may include computer-readable volatile and non-volatile media and computer-readable removable and non-removable media.

In the example of FIG. 16, computer 1600 includes memory 1604. Memory 1604 can include computer-readable media in the form of volatile memory, such as random-access memory (RAM) 1608 and/or cache memory 1610. Computer 1600 can also include other removable/non-removable, volatile/non-volatile computer storage media. By way of example, storage system 1612 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1606 by one or more data media interfaces. Memory 1604 is an example of at least one computer program product.

Program/utility 1614 may be stored in memory 1604 and is executable by processor(s) 1602. By way of example, program/utility 1614 may represent an operating system, one or more application programs, other programs, and/or program data. Program/utility 1614 generally carries out the functions and/or methodologies of the example implementations described within this disclosure. Program/utility 1614 and any data items used, generated, and/or operated upon by computer 1600 are functional data structures that impart functionality when employed by computer 1600.

Computer 1600 may also communicate with one or more external devices 1620 such as a keyboard, a pointing device, a display 1622, etc.; one or more devices that enable a user to interact with computer 1600; and/or any devices (e.g., network card, modem, etc.) that enable computer 1600 to communicate with one or more other computing devices. Such communication can occur via input/output (I/O) interfaces 1618. Still, computer 1600 can communicate with one or more networks such as a local area network (LAN), a general wide area network (WAN), and/or a public network (e.g., the Internet) via a network adapter 1624. As depicted, network adapter 1624 communicates with the other components of computer 1600 via bus 1606. It should be understood that although not shown, other hardware and/or software components could be used in conjunction with computer 1600. Examples, include, but are not limited to: microcode, device drivers, redundant processing units, external disk drive arrays, RAID systems, tape drives, and data archival storage systems, etc.

Computer 1600 may include fewer components than shown or additional components not illustrated in FIG. 16 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computer 1600 may be operational with numerous other general-purpose or special-purpose computing system environments or configurations. Examples of computing systems, environments, and/or configurations that may be suitable for use with computer 1600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 1600 can be practiced as a standalone device, as a bare metal server, in a cluster (e.g., two or more interconnected computers), or in a distributed cloud computing environment where tasks are performed by remote processing devices that are linked through a communications network. In a distributed cloud computing environment, program modules may be located in both local and remote computer system storage media including memory storage devices. Computer 1600 is an example of a data processing system and/or computer hardware that is capable of performing the various operations described within this disclosure.

Some computing environments, e.g., cloud computing environments and/or edge computing environments using computer 1600 or other suitable data processing system, generally support the FPGA-as-a-Service (FaaS) model. In the FaaS model, user functions are hardware accelerated as circuit designs implemented within programmable ICs operating under control of the (host) data processing systems. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory. As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

A method can include performing, using computer hardware, a global assignment phase by clustering a plurality of super-long lines (SLLs) into a plurality of SLL bins, clustering loads of nets of a circuit design into a plurality of load clusters, and assigning the plurality of SLL bins to the plurality of load clusters forming a plurality of SLL bin and load cluster pairs. The method can include, for each SLL bin and load cluster pair, performing a detailed assignment phase. The detailed assignment phase can include, for each net having a load in the load cluster, assigning one or more particular SLLs of the SLL bin to the net using the computer hardware.

The foregoing and other implementations can each optionally include one or more of the following features, alone or in combination. Some example implementations include all the following features in combination.

In another aspect, the clustering includes, for each net, dividing a region of circuitry including the loads of the net into a number of sub-regions corresponding to a maximum number of load clusters allowed for the net and creating a load cluster for each sub-region that includes at least one load of the net.

In another aspect, the method includes merging two or more SLL clusters during the global assignment phase.

In another aspect, the method includes, during the global assignment phase, performing at least one of wirelength optimization, congestion optimization, or timing optimization.

In another aspect, the method includes processing a first cut of the circuit design and a second cut of the circuit design by performing the global assignment phase for each of the first cut and the second cut prior to performing a detailed assignment phase on the first cut or the second cut.

In another aspect, for a selected net that spans the first cut and the second cut, projecting a load cluster corresponding to the second cut of the selected net into a different super logic region (SLR) for use during the implementation of the global assignment phase for the first cut.

In another aspect, the selected net has a driver in a first super logic region (SLR), a first load cluster in a second SLR, and a second load cluster in a third SLR. In that case, the method can include projecting the second load cluster to a location in the second SLR for performing the global assignment phase for the first cut.

In another aspect, the one or more particular SLLs of the SLL bin are assigned to the net using a selected detailed assignment technique selected from a plurality of detailed assignment techniques based on timing criticality of the SLL bin.

In another aspect, timing criticality of the bin is determined using a reference SLL of the SLL bin to represent timing characteristics of each SLL of the SLL bin.

In another aspect, a first detailed assignment technique of the plurality of detailed assignment techniques includes, for a selected SLL bin and load cluster pair, assigning nets of the load cluster of the pair to SLLs of the SLL bin of the pair based on wirelength displacement of the nets of the SLL bin of the pair. A second detailed assignment technique of the plurality of detailed assignment techniques includes, for a selected SLL bin and load cluster pair, modeling assignment of nets of the load cluster of the pair to SLLs of the SLL bin of the pair as a bottleneck assignment problem, generating an Integer Linear Programming formulation, and solving the Integer Linear Programming formulation.

Other example implementations include a system having a processor configured to initiate operations as described herein and a computer program product having one or more computer readable storage media, and program instructions collectively stored on the one or more computer readable storage media, wherein the program instructions are executable by computer hardware to initiate operations as described herein.

What is claimed is:

1. A method, comprising:
performing, using computer hardware, a global assignment phase by clustering a plurality of super-long lines (SLLs) into a plurality of SLL bins, clustering loads of nets of a circuit design into a plurality of load clusters, and assigning the plurality of SLL bins to the plurality of load clusters; and
for each SLL bin, performing a detailed assignment phase wherein each net having a load cluster assigned to the SLL bin is assigned one or more particular SLLs of the SLL bin using the computer hardware.

2. The method of claim 1, wherein the clustering includes:
for each net, dividing a region of circuitry including the loads of the net into a number of sub-regions corresponding to a maximum number of load clusters allowed for the net and creating a load cluster for each sub-region that includes at least one load of the net.

3. The method of claim 1, further comprising:
merging two or more SLL clusters during the global assignment phase.

4. The method of claim 1, further comprising:
during the global assignment phase, performing at least one of wirelength optimization, congestion optimization, or timing optimization.

5. The method of claim 1, further comprising:
processing a first cut of the circuit design and a second cut of the circuit design by performing the global assignment phase for each of the first cut and the second cut prior to performing a detailed assignment phase on the first cut or the second cut.

6. The method of claim 5, further comprising:
for a selected net that spans the first cut and the second cut, projecting a load cluster corresponding to the second cut of the selected net from a super logic region (SLR) into a different SLR for use during the global assignment phase for the first cut.

7. The method of claim 6, wherein the selected net has a driver in a SLR, a first load cluster in a second SLR, and a second load cluster in a third SLR, the method comprising:
projecting the second load cluster to a location in the second SLR for performing the global assignment phase for the first cut.

8. The method of claim 1, wherein:
for each SLL bin, the one or more particular SLLs of the SLL bin are assigned to nets having a load cluster assigned to the SSL bin using a selected detailed assignment technique selected from a plurality of detailed assignment techniques based on timing criticality of the SLL bin.

9. The method of claim 8, wherein:
timing criticality of the SLL bin is determined using a reference SLL of the SLL bin to represent timing characteristics of each SLL of the SLL bin.

10. The method of claim 9, wherein:
a first detailed assignment technique of the plurality of detailed assignment techniques includes, for a selected SLL bin, assigning nets having a load cluster assigned to the selected SLL bin to an SLL of the selected SLL bin based on wirelength displacement of the nets of the selected SLL bin; and
a second detailed assignment technique of the plurality of detailed assignment techniques includes, for a selected SLL bin, modeling assignment of nets having a load cluster assigned to the selected SLL bin as a bottleneck assignment problem, generating an Integer Linear Programming formulation, and solving the Integer Linear Programming formulation.

11. A system, comprising:
a processor configured to initiate operations including:
performing a global assignment phase by clustering a plurality of super-long lines (SLLs) into a plurality of SLL bins, clustering loads of nets of a circuit design into a plurality of load clusters, and assigning the plurality of SLL bins to the plurality of load clusters; and
for each SLL bin, performing a detailed assignment phase wherein each net having a load cluster assigned to the SLL bin is assigned one or more particular SLLs of the SLL bin.

12. The system of claim 11, wherein the clustering includes:
for each net, dividing a region of circuitry including the loads of the net into a number of sub-regions corresponding to a maximum number of load clusters allowed for the net and creating a load cluster for each sub-region that includes at least one load of the net.

13. The system of claim 11, wherein the processor is further configured to initiate operations comprising:
merging two or more SLL clusters during the global assignment phase.

14. The system of claim 11, wherein the processor further is configured to initiate operations comprising:
during the global assignment phase, performing at least one of wirelength optimization, congestion optimization, or timing optimization.

15. The system of claim 11, wherein the processor is further configured to initiate operations comprising:
processing a first cut of the circuit design and a second cut of the circuit design by performing the global assignment phase for each of the first cut and the second cut prior to performing a detailed assignment phase on the first cut or the second cut.

16. The system of claim 15, wherein the processor is further configured to initiate operations comprising:
for a selected net that spans the first cut and the second cut, projecting a load cluster corresponding to the second cut of the selected net from a super logic region (SLR) into a different SLR for use during the global assignment phase for the first cut.

17. The system of claim 16, wherein the selected net has a driver in a first SLR, a first load cluster in a second SLR, and a second load cluster in a third SLR, and wherein the processor is configured to initiate operations comprising:
projecting the second load cluster to a location in the second SLR for performing the global assignment phase for the first cut.

18. The system of claim 11, wherein:
for each SLL bin, the one or more particular SLLs of the SLL bin are assigned to nets having a load cluster assigned to the SLL bin using a selected detailed assignment technique selected from a plurality of detailed assignment techniques based on timing criticality of the SLL bin.

19. The system of claim 18, wherein:
a first detailed assignment technique of the plurality of detailed assignment techniques includes, for a selected SLL bin, assigning nets having a load cluster assigned to the selected SLL bin to an SLL of the selected SLL bin based on wirelength displacement of the nets of the selected SLL bin; and
a second detailed assignment technique of the plurality of detailed assignment techniques includes, for a selected SLL bin, modeling assignment of nets having a load cluster assigned to the selected SLL bin as a bottleneck assignment problem, generating an Integer Linear Programming formulation, and solving the Integer Linear Programming formulation.

20. A computer program product, comprising:
one or more computer readable storage media, and program instructions collectively stored on the one or more computer readable storage media, wherein the program instructions are executable by computer hardware to initiate operations including:
performing a global assignment phase by clustering a plurality of super-long lines (SLLs) into a plurality of SLL bins, clustering loads of nets of a circuit design into a plurality of load clusters, and assigning the plurality of SLL bins to the plurality of load clusters; and
for each SLL bin, performing a detailed assignment phase wherein each net having a load cluster assigned to the SLL bin is assigned one or more particular SLLs of the SLL bin.

* * * * *